(12) United States Patent
Li et al.

(10) Patent No.: US 11,133,564 B2
(45) Date of Patent: Sep. 28, 2021

(54) POSITIVE ELECTRODE PLATE AND ELECTROCHEMICAL DEVICE

(71) Applicant: Contemporary Amperex Technology Co., Limited, Ningde (CN)

(72) Inventors: Xing Li, Ningde (CN); Zhenhua Li, Ningde (CN); Haizu Jin, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/043,711

(22) PCT Filed: Nov. 15, 2019

(86) PCT No.: PCT/CN2019/118825
§ 371 (c)(1),
(2) Date: Sep. 30, 2020

(87) PCT Pub. No.: WO2020/098787
PCT Pub. Date: May 22, 2020

(65) Prior Publication Data
US 2021/0050583 A1    Feb. 18, 2021

(30) Foreign Application Priority Data

Nov. 16, 2018  (CN) .......................... 201811371594.1

(51) Int. Cl.
*H01M 4/62*      (2006.01)
*H01M 50/581*   (2021.01)
(Continued)

(52) U.S. Cl.
CPC ......... *H01M 50/581* (2021.01); *H01M 4/622* (2013.01); *H01M 4/667* (2013.01);
(Continued)

(58) Field of Classification Search
None
See application file for complete search history.

(56) References Cited

U.S. PATENT DOCUMENTS 5,565,284 A * 10/1996 Koga ...................... H01M 4/04
429/217
2011/0086269 A1    4/2011 Yamaguchi et al.
(Continued)

FOREIGN PATENT DOCUMENTS

CN       102881861 A     1/2013
CN       102908838 A     1/2013
(Continued)

OTHER PUBLICATIONS

The First Official Action and search report dated Aug. 28, 2020 for Chinese application No. 201811371594.1, 8 pages.
(Continued)

*Primary Examiner* — Haixia Zhang
(74) *Attorney, Agent, or Firm* — Law Offices of Liaoteng Wang

(57) ABSTRACT

This application relates to a positive electrode plate and an electrochemical device. The positive electrode plate includes a current collector, a safety coating, a difficultly soluble layer and a positive active material layer, wherein the safety coating, the difficultly soluble layer and the positive active material layer are successively disposed on the current collector; wherein the safety coating includes a polymer matrix, a conductive material and an inorganic filler; wherein the difficultly soluble layer includes a binder and a conductive agent, and wherein the binder of the difficultly soluble layer has a solubility in an oil solvent smaller than the solubility of the polymer matrix of the safety coating in such oil solvent.

17 Claims, 4 Drawing Sheets

(51) Int. Cl.
*H01M 4/66* (2006.01)
*H01M 4/02* (2006.01)

(52) U.S. Cl.
CPC .............. *H01M 2004/021* (2013.01); *H01M 2004/028* (2013.01); *H01M 2200/106* (2013.01)

(56) References Cited

U.S. PATENT DOCUMENTS

| | | | |
|---|---|---|---|
| 2011/0292596 A1 | 12/2011 | El-Essawy et al. | |
| 2013/0089781 A1* | 4/2013 | Miyazaki | H01M 4/668 429/211 |
| 2016/0308192 A1* | 10/2016 | Lee | H01M 4/131 |
| 2020/0020925 A1* | 1/2020 | Aya | H01M 10/056 |

FOREIGN PATENT DOCUMENTS

| | | |
|---|---|---|
| CN | 103165840 A | 6/2013 |
| CN | 103165863 A | 6/2013 |
| CN | 203300738 U | 11/2013 |
| CN | 103515573 A | 1/2014 |
| CN | 104409681 A | 3/2015 |
| CN | 205004384 U | 1/2016 |
| CN | 205900697 U | 1/2017 |
| CN | 107437622 A | 12/2017 |
| CN | 108258249 A | 7/2018 |
| CN | 108666524 A | 10/2018 |
| EP | 2212949 A1 | 8/2014 |
| JP | 2009176550 A | 8/2009 |
| JP | 2010251047 A | 11/2010 |
| KR | 100670485 B1 | 1/2007 |
| KR | 20160143300 A | 12/2016 |
| WO | 2013021630 A1 | 2/2013 |

OTHER PUBLICATIONS

PCT International Search Report for PCT/CN2019/118825, dated Feb. 18, 2020, 13 pages.
The Extended European Search Report for European Application No. 19884550.5, dated Jul. 28, 2021, 6 pages.

* cited by examiner

POSITIVE ELECTRODE PLATE AND ELECTROCHEMICAL DEVICE

CROSS-REFERENCE TO RELATED APPLICATION

This application is a National Stage of International Application No. PCT/CN2019/118825, filed on Nov. 15, 2019, which claims priority to Chinese Patent Application No. 201811371594.1 filed on Nov. 16, 2018, which is incorporated herein by reference in its entirety.

TECHNICAL FIELD

The present application relates to the field of electrochemical technology, and more particularly, to a positive electrode plate and an electrochemical device containing the positive electrode plate.

BACKGROUND

Lithium ion batteries are widely used in electric vehicles and consumer electronics because of their advantages such as high energy density, high output power, long cycle life and small environmental pollution. However, lithium ion batteries are prone to fire and explode when subjected to abnormal conditions such as crushing, bumping or puncture, causing serious harm. Therefore, the safety problem of lithium ion batteries greatly limits the application and popularity of lithium ion batteries.

A large number of experimental results show that internal short circuit of lithium ion battery is the basic cause of the battery's safety hazard. In order to avoid the internal short-circuit of the battery, researchers have tried to improve the battery in many ways, including the use of PTC materials to improve the safety performance of lithium ion battery. A PTC (Positive Temperature Coefficient) material is a positive temperature coefficient heat sensitive material, which has the characteristic that its resistivity increases with increasing temperature. When the temperature exceeds a certain temperature, the resistivity of the PTC material increases rapidly stepwise.

In the study of utilizing the characteristics of PTC materials to improve the safety performance of lithium ion battery, some studies involve addition of PTC materials to the electrode active material layer of the battery. When the temperature of the battery rises, the resistance of the PTC material increases, thereby causing the resistance of the entire electrode active material layer to become large, and even destroying the conductive path of the entire electrode active material layer. Thus the security effect is achieved by causing power interruption and preventing the electrochemical reaction from proceeding. However, with this modification, the PTC material added in the electrode active material layer adversely affects the electrochemical performance of the battery.

Still other studies have provided a separate layer of PTC material (safety coating) between the current collector and the electrode active material layer of the battery. When the temperature of the battery rises, the resistance of the PTC material layer increases, so that the electric resistance between the current collector and the electrode active material layer is increased or even power supply is interrupted, thereby achieving the security effect of preventing the electrochemical reaction from proceeding. However, with this modification, when an active material slurry is coated on the surface of the PTC material layer, the solvent (such as NMP) in the slurry would dissolve the PTC material of the PTC layer and thus the dissolved PTC material enters the upper active material layer, which not only destroys the PCT effect of the PTC layer and also deteriorates its electrical performance. In addition, in the compacting step of the plate fabrication process, the PTC material layer is easily squeezed to the edge and thus the electrode active material layer would be in direct contact with the current collector, so that the PTC material layer cannot improve the safety performance. In addition, it is required to greatly improve the performance of the PTC material layer, such as the response speed, the effect of blocking current.

In view of this, it is indeed necessary to provide a positive electrode plate and a battery with improved safety and battery performance, which is capable of solving the above problems.

SUMMARY

It is an object of this application to provide a positive electrode plate and an electrochemical device with improved safety and electrical performance.

The present application provides a positive electrode plate, including a current collector, a safety coating, a difficultly soluble layer and a positive active material layer, wherein the safety coating, the difficultly soluble layer and the positive active material layer are successively disposed on the current collector; wherein the safety coating includes a polymer matrix, a conductive material and an inorganic filler; wherein the difficultly soluble layer includes a binder and a conductive agent, and wherein the binder of the difficultly soluble layer has a solubility in an oil solvent smaller than the solubility of the polymer matrix of the safety coating.

Preferably, the binder in the difficultly soluble layer is one of an oil-dispersible binder or a water-dispersible binder, wherein the oil-dispersible binder is selected from at least one of oil-dispersible polyacrylonitrile, oil-dispersible polyacrylic acid, oil-dispersible polyacrylate, oil-dispersible polyacrylic acid-acrylate, oil-dispersible polyacrylonitrile-acrylic acid, and oil-dispersible polyacrylonitrile-acrylate; and wherein the water-dispersible binder is selected from at least one of water-dispersible polyacrylic acid, water-dispersible polyurethane, water-dispersible polyvinyl alcohol, water-dispersible polyacrylate, water-dispersible polytetrafluoroethylene, and water-dispersible polyacrylonitrile Preferably, the polymer matrix in the safety coating is fluorinated polyolefin and/or chlorinated polyolefin. Preferably, based on the total weight of the polymer matrix, the conductive material, and the inorganic filler, the polymer matrix is present in an amount of from 35 wt % to 75 wt % and preferably from 50 wt % to 75 wt %; the conductive material is present in an amount of from 5 wt % to 25 wt % and preferably from 5 wt % to 20 wt %; and the inorganic filler is present in an amount of from 10 wt % to 60 wt % and preferably from 15 wt % to 45 wt %.

The present application also provides an electrochemical device comprising the positive electrode plate according to present application, wherein the electrochemical device is preferably a capacitor, a primary battery or a secondary battery.

DESCRIPTION OF THE DRAWINGS

The positive electrode plate and the electrochemical device of this application as well as the beneficial effects thereof will be described in details below with reference to the accompanying drawings and specific embodiments.

Figure 1:
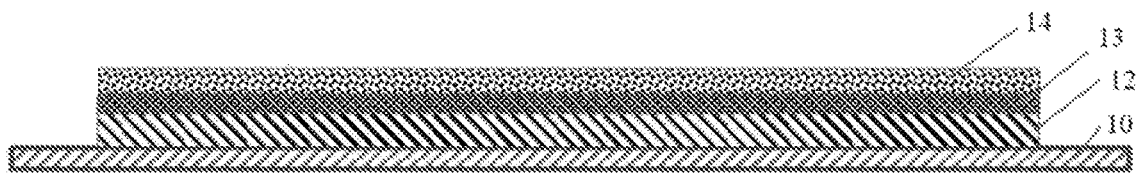
FIG. 1 is a schematic structural view of a positive electrode plate according to an embodiment of this application, in which 10—a current collector; 12—a safety coating (i.e. a PTC safety coating); 13—a difficultly soluble layer; 14—a positive active material layer.

In the drawings, the reference numerals are defined as follows:

1 battery pack
2 upper cabinet body
3 lower cabinet body
4 battery module
5 battery
51 case
52 electrode assembly
53 top cover assembly.

DETAILED DESCRIPTION

The present application provides a positive electrode plate, comprising a current collector, a safety coating, a difficultly soluble layer and a positive active material layer, wherein the safety coating, the difficultly soluble layer and the positive active material layer are successively disposed on the current collector; wherein the safety coating comprises a polymer matrix, a conductive material and an inorganic filler; wherein the difficultly soluble layer comprises a binder and a conductive agent, and wherein the binder of the difficultly soluble layer has a solubility in an oil solvent smaller than the solubility of the polymer matrix of the safety coating.

FIG. 1 shows a schematic structural view of a positive electrode plate according to an embodiment of this application, in which 10—a current collector; 12—a safety coating (i.e. a PTC safety coating); 13—a difficultly soluble layer; 14—a positive active material layer.

It is easy to understand that FIG. 1 only shows the embodiment in which the PTC safety coating 12, the difficultly soluble layer 13 and the positive active material layer 14 are only provided on one side of the positive electrode collector 10; however, in some other embodiments, the PTC safety coating 12, the difficultly soluble layer 13 and the positive active material layer 14 may be respectively disposed on both sides of the positive current collector 10.

Traditional coatings with PTC effect used in batteries usually comprise a polymer matrix and a conductive material, wherein polyethylene, polypropylene, or an ethylene-propylene copolymer is usually used as the PTC matrix material; in this case, an additional binder needs to be added to the PTC matrix and the conductive material. If the content of the binder is too small, the adhesion between the coating and the current collector is poor. If the content of the binder is too large, the performance such as the responding temperature and response speed of PTC effect will be affected. It was also found that when the active material slurry is coated on the surface of the PTC material layer, the solvent (such as NMP) in the slurry will dissolve the PTC material in the PTC layer and thus the dissolved PTC material will enter the upper active material layer, which will not only make the PTC layer lose PTC effect, and but also deteriorate electrical performance. In order to overcome the above drawbacks, the present application starts from multiple aspects and uses a variety of technical means to coordinately process to improve the performance and stability of the PTC safety coating.

First, the inventors have found that, the addition of an inorganic filler in the safety coating of a positive electrode plate can stabilize the safety coating.

It has been found that in the case that the safety coating does not contain an inorganic filler, the electrolyte or the solvent (such as NMP) in the positive active material layer over the safety coating adversely dissolves and swells the polymer material in the safety coating, thereby damaging the safety coating and affecting its PTC effect. After adding an inorganic filler to the safety coating, the inorganic filler functions as a barrier, thereby advantageously eliminating the above-mentioned adverse effects such as dissolving and swelling, and thus advantageously stabilizing the safety coating. In addition, it has also been found that the addition of the inorganic filler is also advantageous for ensuring that the safety coating is not easily deformed during compaction of the electrode plate. Therefore, the addition of the inorganic filler can well ensure that the safety coating is stably disposed between the current collector and the positive active material layer and that the current collector is prevented from directly contacting with the positive active material layer, thereby improving safety performance of the battery.

In summary, the inorganic filler can function as stabilizing the safety coating from the following two aspects: (1) hindering the electrolyte or the solvent (usually an organic oil solvent, such as NMP) of the positive active material layer from dissolving or swelling the polymer material of the safety coating; and (2) being conducive to guaranteeing that the safety coating is not easily deformed during the plate compaction process.

Surprisingly, the inventors have also found that inorganic fillers can also improve the performance such as the response speed of the safety coating. The safety coating works as below. At normal temperature, the safety coating relies on a good conductive network formed between the conductive materials to conduct electron conduction. When the temperature rises, the volume of the polymer matrix materials begins to expand, the spacing between the particles of the conductive materials increases, and the conductive network is partially blocked, so that the resistance of the safety coating increases gradually. When a certain temperature for example the operating temperature is reached, the conductive network is almost completely blocked, and the current approaches zero. However, usually the conductive network is partially recovered, when the inside of the safety coating reaches a dynamic balance. Therefore, after reaching a certain temperature for example the operating temperature, the resistance of the safety coating is not as large as expected, and still there is very small current flowing through. The inventors have found that after the inorganic filler is added and the volume of the polymer matrix materials expands, the inorganic filler and the expanded polymer matrix material can function to block the conductive network. Therefore, after the addition of the inorganic filler, the safety coating can better produce PTC effect in the operating temperature range. That is to say, the increasing speed of resistance is faster and the PTC response speed is faster at a high temperature. As a result, the safety performance of battery can be improved better.

The inorganic filler may be selected from at least one of metal oxides, non-metal oxides, metal carbides, non-metal carbides, and inorganic salts, all optionally modified with at least one of a conductive carbon coating, a conductive metal coating or a conductive polymer coating.

Secondly, the inventors found that the stability and performance of the safety coating can be further improved by introducing a difficultly soluble layer.

Adding an inorganic filler to a safety coating can help the safety coating resist damage from solvent or electrolyte. On this basis, it is also possible to further eliminate the influence caused by the solvent or the electrolyte by introducing a structure layer having barrier performance between the safety coating and the positive active material layer.

Such a structure layer needs to comprise a conductive agent to maintain the conductivity of the electrode plate, and also needs to comprise a binder to maintain structural integrity. In addition, the solubility of the binder in this structure layer in the organic oil solvent must be less than the solubility of the polymer matrix in the safety coating in the same organic oil solvent, in order to further eliminate the effect of solvent or the electrolyte on swelling and dissolution of the polymer matrix in the safety coating.

If this structure layer is not provided, the following technical problems are likely to be brought about:

(1) Due to the fact that the polymer matrix (such as fluorinated polyolefin and/or chlorinated polyolefin) in the safety coating has relative large dissolution and swelling in organic oil solvents (such as NMP) and electrolyte, when the positive active material layer is coated on the safety coating, if the coating speed is fast, the positive active material layer is prone to crack due to uneven stress;

(2) Due to the fact that the polymer matrix (such as fluorinated polyolefin and/or chlorinated polyolefin) in the safety coating has relative large dissolution and swelling in organic oil solvents (such as NMP) and electrolyte, the introduction of the safety coating will greatly increase the DCR (direct current internal resistance) of battery, which is not conducive to the improvement of kinetic performance of a battery It has been found that oil-dispersible or water-dispersible binder whose solubility in an oil solvent is less than that of the polymer matrix in the safety coating is particularly suitable to solve one or more of the above problems, because it is difficultly soluble in organic oil solvents such as NMP commonly used in battery manufacturing than the polymer matrix in the safety coating, and it can also serve as a binder. Therefore, this structure layer may include a conductive agent and a binder, and preferably consists essentially of a conductive agent and a binder. For convenience, the structure layer may be referred to as a "barrier layer" or a "difficultly soluble layer". The oil-dispersible binder is preferably selected from at least one of oil-dispersible polyacrylonitrile, oil-dispersible polyacrylic acid, oil-dispersible polyacrylate, oil-dispersible polyacrylic acid-acrylate, oil-dispersible polyacrylonitrile-acrylic acid, and oil-dispersible polyacrylonitrile-acrylate; and the water-dispersible polymer material is selected from at least one of water-dispersible polyacrylic acid, water-dispersible polyurethane, water-dispersible polyvinyl alcohol, water-dispersible polyacrylate, water-dispersible polytetrafluoroethylene, and water-dispersible polyacrylonitrile.

Therefore, in the embodiments of the present application, the positive electrode plate comprises a safety coating layer, a difficultly soluble layer (barrier layer), and a positive active material layer which are sequentially coated on a current collector, wherein the safety coating layer comprises a polymer matrix, a conductive material and an inorganic filler, and wherein the difficultly soluble layer comprises a conductive agent and a binder having a solubility in an oil solvent (preferably NMP) less than that of the polymer matrix of the safety coating.

Since the solubility of the difficultly soluble polymer materials in an oil solvent is less than the solubility of fluorinated polyolefin and/or chlorinated polyolefin, the difficultly soluble layer acts as a barrier layer to hinder the fluorinated polyolefin and/or chlorinated polyolefin in the safety coating from too large dissolution and swelling in organic oil solvents (such as NMP) and the electrolyte, thereby solving the problem of cracking and excessive growth of DCR.

Each structural layer and its constituent components of the positive electrode plate of the present application will be specifically described below.

Safety Coating

The safety coating of the positive electrode plate of the present application comprises a polymer matrix, a conductive material, and an inorganic filler. Its working principle is that: at normal temperature, the safety coating relies on a good conductive network formed between the conductive materials to conduct electron conduction. When the temperature rises, the volume of the polymer matrix materials begins to expand, the spacing between the particles of the conductive materials increases, and the conductive network is partially blocked, so that the resistance of the safety coating increases gradually. When a certain temperature for example the operating temperature is reached, the conductive network is almost completely blocked, and the current approaches zero, thereby protecting the electrochemical device using the safety coating The safety coating of the positive electrode plate of the present application can be formed by a conventional method. For example, a desired safety coating may be obtained by dissolving a polymer matrix material, a conductive material, a inorganic filler and optionally other auxiliary agents in a solvent under stirring to form a slurry, applying the slurry onto the current collector followed by heating and drying.

Furthermore, in some preferred embodiments of this application, the safety coating of the positive electrode plate of this application may consist essentially of the polymer matrix, the conductive material, and the inorganic filler, i.e., it does not contain a significant amount (e.g., a content of $\leqslant 3\%$, $\leqslant 1\%$, or $\leqslant 0.5\%$) of other components, and wherein the polymer matrix is fluorinated polyolefin or chlorinated polyolefin.

The safety coating is directly adhered onto current collector and disposed between current collector and the difficultly soluble layer. The thickness H of the safety coating can be reasonably determined according to actual needs. The thickness H of the safety coating is usually not more than 40 μm, preferably not more than 25 μm, more preferably not more than 20 μm, 15 μm or 10 μm. The thickness of the safety coating is usually greater than or equal to 1 μm, preferably greater than or equal to 2 μm, and more preferably greater than or equal to 3 μm. If the thickness is too small, it is not enough to ensure that the safety coating has the effect of improving safety performance of the battery; if it is too large, the internal resistance of the battery will increase seriously, which will affect electrochemical performance of the battery during normal operation. Preferably, 1 µm≤H≤20 µm, more preferably 3 µm≤H≤10 µm.

The bonding force between the safety coating and the current collector is preferably at least 10 N/m. For example, the bonding force between the safety coating and the current collector can be increased by introducing an additional binder or by crosslinking the polymer matrix. Relatively large bonding force may better improve the safety performance during nail penetration of plate.

Polymer Matrix in the Safety Coating

The amount of the polymer matrix is from 35 wt % to 75 wt %, preferably from 40 wt % to 75 wt %, more preferably from 50 wt % to 75 wt %, based on the total weight of the polymer matrix, the conductive material, and the inorganic filler.

In the safety coating, the polymer matrix material may be a polyolefin material or other polymer materials such as polyethylene, polypropylene, ethylene-vinyl acetate copolymer (EVA), ethylene-acrylic acid copolymer, ethylene-methacrylic acid copolymer, polyamide, polystyrene, polyacrylonitrile, thermoplastic elastomer, epoxy resin, polyacetal, thermoplastic modified cellulose, polysulfone, polymethyl (meth)acrylate, a copolymer containing (meth)acrylate and the like. In addition, preferably, the safety coating may also contain a binder that promotes binding force between the polymer matrix material and the current collector. The binder may be for example PVDF, PVDC, SBR, and also may be an aqueous binder selected from the group consisting of CMC, polyacrylate, polycarbonate, polyethylene oxide, rubber, polyurethane, sodium carboxymethyl cellulose, polyacrylic acid, acrylonitrile multi-component copolymer, gelatin, chitosan, sodium alginate, a coupling agent, cyanoacrylate, a polymeric cyclic ether derivative, a hydroxy derivative of cyclodextrin, and the like.

In the conventional coating having PTC effect for use in batteries, polyethylene, polypropylene or ethylene propylene copolymer or the like is generally used as the PTC matrix material. In this case, it is necessary to additionally add a binder to the PTC matrix material and the conductive material. If the binder content is too small, the adhesion between the coating and the current collector is poor; and if the binder content is too large, the performance such as the response temperature and response speed of the PTC effect are affected. The inventors have found that instead of using a conventional PTC matrix material such as polyethylene, polypropylene or ethylene propylene copolymer, a large amount of fluorinated polyolefin and/or chlorinated polyolefin is used between the current collector and the positive active material layer, and can still function as a PTC thermistor layer and help eliminate the problems faced by existing PTC safety coatings. Therefore, it is more preferable to use a fluorinated polyolefin and/or a chlorinated polyolefin as the polymer matrix material.

In the present application, the fluorinated polyolefin or chlorinated polyolefin may be used as a polymer matrix material, in an amount (for example, from 35 wt % to 75 wt %, relative to the total weight of the safety coating) that is much higher than the amount (usually less than 15% or 10%, relative to the total weight of the coating) when fluorinated polyolefin or chlorinated polyolefin is used as a binder.

In the present safety coating, the fluorinated polyolefin or chlorinated polyolefin material actually functions both as a PTC matrix and as a binder. This avoids the influence on the adhesion of the coating, the response speed, and the response temperature of the PTC effect due to the difference between the binder and the PTC matrix material.

Firstly, the safety coating composed of fluorinated polyolefin and/or chlorinated polyolefin material and a conductive material can function as a PTC thermistor layer and its operating temperature range is suitably from 80° C. to 160° C. Thus the high temperature safety performance of the battery may be improved well.

Secondly, fluorinated polyolefin and/or chlorinated polyolefin as the polymer matrix material of the safety coating serves as both a PTC matrix and a binder, thereby facilitating the preparation of a thinner safety coating without affecting the adhesion of the safety coating.

In addition, the solvent (such as NMP) or the electrolyte in the positive active material layer over the safety coating may have an adverse effect such as dissolution, swelling on the polymer material of the safety coating. For the safety coating containing PVDF in a conventional binder amount, the adhesion would be easily getting worse. For the safety coating containing relatively high amount of fluorinated polyolefin and/or chlorinated polyolefin, the above adverse effect is relatively slight.

Therefore, as an improvement of one aspect of the present application, the polymer matrix is preferably fluorinated polyolefin and/or chlorinated polyolefin, i.e. polyvinylidene fluoride (PVDF), polyvinylidene chloride (PVDC), modified PVDF, and/or modified PVDC. For example, the polymer matrix may be selected from the group consisting of PVDF, carboxylic acid modified PVDF, acrylic acid modified PVDF, PVDF copolymer, PVDC, carboxylic acid modified PVDC, acrylic acid modified PVDC, PVDC copolymer or any mixture thereof.

In a preferred embodiment of the present application, the weight percentage of the fluorinated polyolefin and/or chlorinated polyolefin polymer matrix is from 35 wt % to 75 wt %, based on the total weight of the safety coating (or the total weight of the polymer matrix, the conductive material, and the inorganic filler). If the content is too small, the polymer matrix cannot ensure the safety coating works well in terms of its PTC effect; and if the content is too high, it will affect the performance including the response speed and the like of the safety coating. The weight percentage of the fluorinated polyolefin and/or chlorinated polyolefin polymer matrix is preferably from 40 wt % to 75 wt %, more preferably from 50 wt % to 75 wt %.

When a fluorinated polyolefin and/or chlorinated polyolefin polymer matrix materials is used in the safety coating of positive electrode plate of the present application, these materials themselves have good adhesion and can be used as a binder, in addition to being used as a matrix material. Therefore, when such polymer matrix materials are used, the safety coating does not have to contain other additional binders, which can simplify the process and save costs. Therefore, in a preferred embodiment of the present application, the polymer matrix is fluorinated polyolefin and/or a chlorinated polyolefin, and the safety coating is substantially free of other binders than the polymer matrix material (the phrase "substantially free" means≤3%, ≤1%, or ≤0.5%).

In some preferable embodiments of the present application, the polymer matrix is at least partially crosslinked, i.e. a polymer matrix having a crosslinked structure, preferably fluorinated polyolefin and/or chlorinated polyolefin having a crosslinked structure.

The crosslinking treatment may be more advantageous for hindering the adverse effects of a solvent (such as NMP) in the positive active material layer or an electrolyte on the polymer material in the safety coating, such as dissolving or swelling, and for preventing the positive active material layer from cracking due to uneven stress.

In addition, the polymer matrix which is not subjected to crosslinking treatment has relative large dissolution and swelling in the electrolyte, so that the introduction of safety coating will cause a relatively large DCR growth of battery, which is disadvantageous to improvement of the kinetic performance of battery. After being subjected to crosslinking treatment, the solubility of the polymer matrix is effectively suppressed, so that the DCR growth due to introduction of the safety coating can be remarkably reduced.

The procedure of the crosslinking treatment is known in the art. For example, for fluorinated polyolefin and/or chlorinated polyolefin polymer matrix, the crosslinking treatment can be achieved by introducing an activator and a crosslinking agent. The function of the activator is to remove HF or HCl from fluorinated polyolefin and/or chlorinated polyolefin to form a C=C double bond; and the crosslinking agent acts to crosslink the C=C double bond. As an activator, a strong base-weak acid salt such as sodium silicate or potassium silicate can be used. The weight ratio of the activator to the polymer matrix is usually from 0.5% to 5%. The crosslinking agent may be selected from at least one of polyisocyanates (JQ-1, JQ-1E, JQ-2E, JQ-3E, JQ-4, JQ-5, JQ-6, PAPI, emulsifiable MDI, tetraisocyanate), polyamines (propylenediamine, MOCA), polyols (polyethylene glycol, polypropylene glycol, trimethylolpropane), glycidyl ethers (polypropylene glycol glycidyl ether), inorganic substances (zinc oxide, aluminum chloride, aluminum sulfate, sulfur, boric acid, borax, chromium nitrate), glyoxal, aziridine, olefinically unsaturated compounds (styrene, α-methylstyrene, acrylonitrile, acrylic acid, methacrylic acid, acrylates (1,4-butylene glycol diacrylate, ethylene glycol dimethacrylate, triallyl cyanurate (TAC), butyl acrylate, 2-hydroxyethyl acrylate (HEA), hydroxypropyl acrylate (HPA), 2-hydroxyethyl methacrylate (HEMA), 2-hydroxypropyl methacrylate (HPMA), methyl methacrylate (MMA))), organosilicons (ethyl orthosilicate, methyl orthosilicate, trimethoxysilane), benzenesulfonic acids (p-toluenesulfonic acid, p-toluenesulfonyl chloride), organic peroxides (dicumyl peroxide, bis(2,4-dichlorobenzoyl) peroxide), and metal organic compounds (aluminum isopropoxide, zinc acetate, titanium acetylacetonate).

The weight ratio of the crosslinking agent to the polymer matrix is from 0.01% to 5%. If the content of crosslinking agent is small, the crosslinking degree of the polymer matrix is low, which cannot eliminate cracking completely. If the content of crosslinking agent is too high, it is easy to cause gel during stirring. The activator and the crosslinking agent may be added after the stirring step of the slurry for preparing the safety coating is completed. After carrying out the crosslinking reaction, the mixture is uniformly stirred and then coated to prepare a safety coating.

Inorganic Filler in the Safety Coating

The inorganic filler is present in a weight percentage of from 10 wt % to 60 wt % based on the total weight of the polymer matrix material, a conductive material, and an inorganic filler. If the content of the inorganic filler is too small, it will not be enough to stabilize the safety coating; if the content is too large, it will affect the PTC performance of the safety coating. The weight percentage of the inorganic filler is preferably from 15 wt % to 45 wt %.

When the particle size of the first positive active material is too small, the specific surface area increases, and the side reaction increases; when the particle size is too large, the coating thickness of the safety coating is too large and the thickness is uneven. Preferably, the average particle size D of the inorganic filler in the safety coating satisfies 100 nm≤D≤10 μm, and more preferably 1 μm≤D≤6 μm. When the particle size of the inorganic filler is in the above ranges, the effect of blocking the conductive network at a high temperature can be improved, thereby improving the response speed of the safety coating. Further preferably, the inorganic filler in the safety coating has a specific surface area (BET) of not more than 500 m$^2$/g. When the specific surface area of the inorganic filler increases, side reaction will increase and thus the battery performance will be affected. Moreover, in the case that the specific surface area of the inorganic filler is too large, a higher proportion of binder will be consumed, which will cause the binding force among the safety coating, the current collector and the positive active material layer to be reduced and the growth rate of the internal resistance to be high. When the specific surface area (BET) of the inorganic filler is not more than 500 m$^2$/g, a better overall effect can be provided.

The inorganic filler may be selected from at least one of metal oxides, non-metal oxides, metal carbides, non-metal carbides, and an inorganic salts, all optionally modified with at least one of a conductive carbon coating, a conductive metal coating or a conductive polymer coating.

For example, the inorganic filler may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium manganese oxide, lithium nickel oxide, lithium nickel manganese oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, lithium titanate, all optionally modified with at least one of a conductive carbon coating, a conductive metal coating or a conductive polymer coating.

Especially, the inventors have found that it is particularly advantageous when a positive electrode electrochemically active material optionally modified with a conductive carbon coating, a conductive metal coating or a conductive polymer coating is used as an inorganic filler in the case that the safety coating is used for a positive electrode plate. In such a case, in addition to above mentioned functions as stabilizing the safety coating (hindering organic solvent from adverse effects such as dissolving or swelling the polymer material and ensuring that the safety coating is not easily deformed) and as improving the performance such as the response speed and the like of the safety coating, the inorganic filler may further play the following two roles:

(1) to improve the overcharge performance of the battery. In the PTC safety coating system composed of a fluorinated polyolefin and/or chlorinated polyolefin polymer matrix and a conductive material, since the electrochemically active material has the characteristics of lithium ion intercalation and de-intercalation, the electrochemically active material can be used as "active sites" in the conductive network at the normal operating temperature of the battery and thus the number of "active sites" in the safety coating is increased. In the process of overcharging, the electrochemically active material will delithiate, and the de-lithiating process has become more and more difficult, and the impedance is increasing. Therefore, when the current passes, the heat-generating power increases, and the temperature of the primer layer increases faster, so the PTC effect responds faster, which in turn can generate PTC effects before the overcharge safety problem in battery. Thus the overcharge safety performance of a battery may be improved.

(2) to contribute to charge and discharge capacity. Since the electrochemically active material can contribute to a certain charge and discharge capacity at the normal operating temperature of the battery, the effect of the safety coating on the electrochemical performance such as capacity of the battery at the normal operating temperature can be minimized.

Therefore, for a positive electrode plate, it is the most preferred to use a positive electrode electrochemically active material optionally modified with a conductive carbon coating, a conductive metal coating or a conductive polymer coating as the inorganic filler of the safety coating. The positive electrode electrochemically active material is preferably selected from at least one of lithium cobalt oxide, lithium nickel manganese cobalt oxide, lithium nickel manganese aluminate, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, and lithium titanate, all optionally modified with at least one of a conductive carbon coating, a conductive metal coating, a conductive polymer coating. Especially, it is at least one of the above electrochemically active materials modified with a conductive carbon coating, such as a conductive carbon coating modified lithium cobalt oxide, a conductive carbon coating modified lithium nickel manganese cobalt oxide, a conductive carbon coating modified lithium nickel manganese aluminate, a conductive carbon coating modified lithium iron phosphate, a conductive carbon coating modified lithium vanadium phosphate, a conductive carbon coating modified lithium cobalt phosphate, a conductive carbon coating modified lithium manganese phosphate, a conductive carbon coating modified lithium manganese iron phosphate, a conductive carbon coating modified lithium iron silicate, a conductive carbon coating modified lithium vanadium silicate, a conductive carbon coating modified lithium cobalt silicate, a conductive carbon coating modified lithium manganese silicate, a conductive carbon coating modified spinel lithium manganese oxide, a conductive carbon coating modified spinel lithium nickel manganese oxide, a conductive carbon coating modified lithium titanate. These electrochemically active materials and conductive carbon coating modified electrochemically active materials are commonly used materials in the manufacture of lithium batteries, most of which are commercially available. The type of conductive carbon may be graphite, graphene, conductive carbon black, carbon nanotubes or the like. Further, the conductivity of the inorganic filler can be adjusted by adjusting the content of the conductive carbon coating.

Conductive Material in the Safety Coating

Based on the total weight of the polymer matrix, the conductive material and the inorganic filler, the conductive material is present in an amount of from 5 wt % to 25 wt % and preferably from 5 wt % to 20 wt %.

The conductive material may be selected from at least one of a conductive carbon-based material, a conductive metal material, and a conductive polymer material. As illustrative examples, the conductive carbon-based material may be selected from at least one of conductive carbon black, acetylene black, graphite, graphene, carbon nanotubes, carbon nanofibers; the conductive metal material is selected from at least one of Al powder, Ni powder, and gold powder; and the conductive polymer material may be selected from at least one of conductive polythiophene, conductive polypyrrole, and conductive polyaniline. The conductive material may be used alone or in combination of two or more.

Conductive materials are typically used in the form of powders or granules. The particle size may be from 5 nm to 500 nm, for example, from 10 nm to 300 nm, from 15 nm to 200 nm, from 15 nm to 100 nm, from 20 nm to 400 nm, from 20 nm to 150 nm, or the like, depending on the specific application environment.

In the present application, relative to the total weight of the safety coating, the conductive material is present in an amount of from 5 wt % to 25 wt % and preferably from 5 wt % to 20 wt %. Preferably, the weight ratio of the polymer matrix material to the conductive material is 2 or more. Under this dosage ratio, the safety of nail penetration can be further improved. If the weight ratio of the polymer matrix material to the conductive material is less than 2, the content of the conductive material is relatively high, and when the temperature increases, the conductive network may not be fully disconnected, thereby affecting the PTC effect. If the weight ratio of the polymer matrix material to the conductive material is too high, the content of the conductive material is relatively low, which will cause the DCR of the battery to increase significantly during normal operation. Preferably, a weight ratio of the polymer matrix to the conductive material is 2 or more and 8 or less.

Difficultly Soluble Layer

The difficultly soluble layer comprise a conductive agent and a binder and other optional auxiliaries. Preferably, the difficultly soluble layer consists essentially of a conductive agent and a binder. The formation of the difficultly soluble layer is similar to the safety coating. For example, the conductive agent and the binder can be stirred to form a slurry in an appropriate solvent (such as NMP or water), and then the slurry is applied to the surface of the safety coating. The required difficultly soluble layer can be obtained by heating and drying.

The binder in the difficultly soluble layer may be an oil-dispersible binder or a water-dispersible binder, wherein the oil-dispersible binder is selected from at least one of oil-dispersible polyacrylonitrile, oil-dispersible polyacrylic acid, oil-dispersible polyacrylate, oil-dispersible polyacrylic acid-acrylate, oil-dispersible polyacrylonitrile-acrylic acid, and oil-dispersible polyacrylonitrile-acrylate; and wherein the water-dispersible binder is selected from at least one of water-dispersible polyacrylic acid, water-dispersible polyurethane, water-dispersible polyvinyl alcohol, water-dispersible polyacrylate, water-dispersible polytetrafluoroethylene, and water-dispersible polyacrylonitrile.

For convenience, such structure layer may be referred to as a "barrier layer" or a "difficultly soluble layer".

In this application, the water-dispersible binder means that the polymer molecular chain is completely extended and dispersed in water, and the oil-dispersible binder means that the polymer molecular chain is completely extended and dispersed in the oil solvent. Those skilled in the art understand that by using a suitable surfactant, the same type of polymer material can be dispersed in water and oil, respectively. That is to say, by using a suitable surfactant, the same type of polymer material can be made into a water-dispersible binder and an oil-dispersible binder, respectively. For example, those skilled in the art can appropriately select water-dispersible polyacrylonitrile or oil-dispersible polyacrylonitrile as a binder in the difficultly soluble layer, or select water-dispersible polyacrylate or oil-dispersible polyacrylate as a binder in the difficultly soluble layer.

If the solubility of the fluorinated polyolefin and/or chlorinated polyolefin polymer material such as PVDF or PVDC in NMP is 100%, the solubility of the preferred binder of the difficultly soluble layer in NMP is substantially no more than 30%. For example, the solubility of oil-dispersible polyacrylonitrile in NMP is about 8%, and that of oil-dispersible polyacrylate in NMP is 15%; the solubility of water-dispersible polymer materials such as water-dispersible polyacrylic acid, water-dispersible polyurethane, and water-dispersible polyvinyl alcohol in NMP is no more than 5%.

Since the addition of the water-dispersible binder as a binder for the difficultly soluble layer may increase the brittleness of the coating, which is disadvantageous to the improvement of the safety performance of the battery and to the improvement of the cycle life, it is preferred to add the oil-dispersible binder as a binder for the difficultly soluble layer. The conductive agent may be selected from at least one of a conductive carbon-based material, a conductive metal material, and a conductive polymer material. As illustrative examples, the conductive carbon-based material may be selected from at least one of conductive carbon black, acetylene black, graphite, graphene, carbon nanotubes, carbon nanofibers; the conductive metal material is selected from at least one of Al powder, Ni powder, and gold powder; and the conductive polymer material may be selected from at least one of conductive polythiophene, conductive polypyrrole, and conductive polyaniline. The conductive agent may be used alone or in combination of two or more.

The conductive agent are typically used in the form of powders or granules. The particle size may be from 5 nm to 500 nm, for example, from 10 nm to 300 nm, from 15 nm to 200 nm, from 15 nm to 100 nm, from 20 nm to 400 nm, from 20 nm to 150 nm, or the like, depending on the specific application environment.

It should be noted that the conductive agent in the difficultly soluble layer and the conductive material in the safety coating may be the same or different.

In the difficultly soluble layer, the weight ratio of the binder to the conductive agent is preferably 9:1 to 1:9.

The thickness of the difficultly soluble layer is usually less than the thickness of the safety coating, preferably between 0.5 µm and 3 µm. When the thickness of the difficultly soluble layer is less than 0.5 µm, the improvement effect may not be obvious; when the thickness of the difficultly soluble layer is more than 3 µm, the energy density of the battery may be reduced.

Positive Active Material Layer

As the positive active material layer used for the positive electrode plate of the present application, various conventional positive active material layers known in the art can be used, and the components and preparation method thereof are well known in the art without any particular limitation. The positive active material layer contains a positive active material, and various positive active materials for preparing a lithium ion secondary battery positive electrode known to those skilled in the art may be used. For example, the positive active material is a lithium-containing composite metal oxide, for example one or more of $LiCoO_2$, $LiNiO_2$, $LiMn_2O_4$, $LiFePO_4$, lithium nickel cobalt manganese oxides (such as $LiNi_{0.5}Co_{0.2}Mn_{0.3}O_2$) and one or more of lithium nickel manganese oxides.

When the positive electrode electrochemically active material (or a coating modified material thereof) is used as the inorganic filler of the safety coating of the positive electrode plate, the positive electrochemically active material in the safety coating and the positive active material used in the positive active material layer may be the same or different.

Current Collector

For the current collector, the common materials in the art, preferably metal current collectors, such as metal flakes or metal foils of stainless steel, aluminum, copper, titanium, can be used. Preferably, the current collector is a porous current collector (for example, a porous aluminum foil). Use of a porous aluminum foil can reduce the probability of occurrence of the metal burrs and further reduce the probability of occurrence of a severe aluminothermic reaction in an abnormal situation such as nailing. Therefore, safety performance of the battery may be further improved. In addition, use of a porous aluminum foil can also improve infiltration of the electrolyte to the electrode plate, and thereby improve the kinetic performance of the lithium ion battery. The safety coating can cover the surface of the porous aluminum foil to prevent the leakage of the upper active material layer during the coating process.

Further, in consideration of the safety performance during nail penetration, the elongation at break δ of the current collector is preferably $0.8\% \leq \delta \leq 4\%$. It was found that if the elongation at break of the current collector is too large, the metal burrs will be larger when punctuation, which is not conducive to improving safety performance of the battery. Conversely, if the elongation at break of the current collector is too small, breakage is likely to occur during processing such as plate compaction or when the battery is squeezed or collided, thereby degrading quality or safety performance of the battery. Therefore, in order to further improve safety performance, particularly safety performance during nail penetration, the elongation at break δ of the current collector should be not more than 4% and not less than 0.8%. The elongation at break of the metal current collector can be adjusted by changing purity, impurity content and additives of the metal current collector, the billet production process, the rolling speed, the heat treatment process, and the like.

The negative electrode plate for use in conjunction with the positive electrode plate of the present application may be selected from various conventional negative electrode plates in the art, and the components and preparation thereof are well known in the art. For example, the negative electrode plate may comprise a negative electrode current collector and a negative active material layer disposed on the negative electrode current collector, and the negative active material layer may comprise a negative electrode active material, a binder, a conductive material, and the like. The negative electrode active material is, for example, a carbonaceous material such as graphite (artificial graphite or natural graphite), conductive carbon black, carbon fiber; a metal or a semimetal material such as Si, Sn, Ge, Bi, Sn, In, or an alloy thereof; and a lithium-containing nitride or a lithium-containing oxide, a lithium metal or a lithium aluminum alloy.

The present application also discloses an electrochemical device comprising the positive electrode plate according to the present application. The electrochemical device may be a capacitor, a primary battery, or a secondary battery. For example, it may be a lithium ion capacitor, a lithium ion primary battery, or a lithium ion secondary battery. Except for the use of the positive electrode plate of the present application, the construction and preparation methods of these electrochemical devices are known per se. The electrochemical device can have improved safety (e.g. nail penetration safety) and electrical performance due to the use of the positive electrode plate of the present application. Further, since the positive electrode plate of the present application is easy to manufacture, the manufacturing cost of the electrochemical device can be reduced due to use of the positive electrode plate of the present application.

Figure 2:
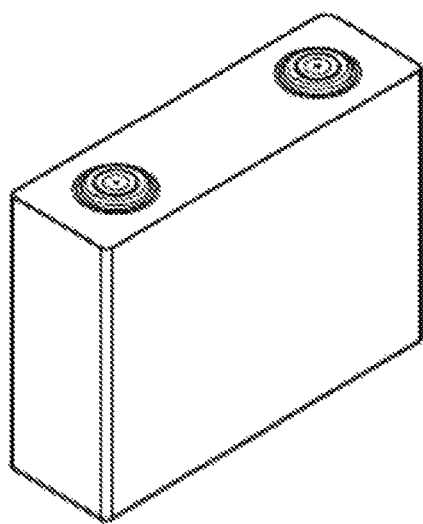
FIG. 2 is a perspective view of an embodiment of a lithium ion battery.
Figure 3:
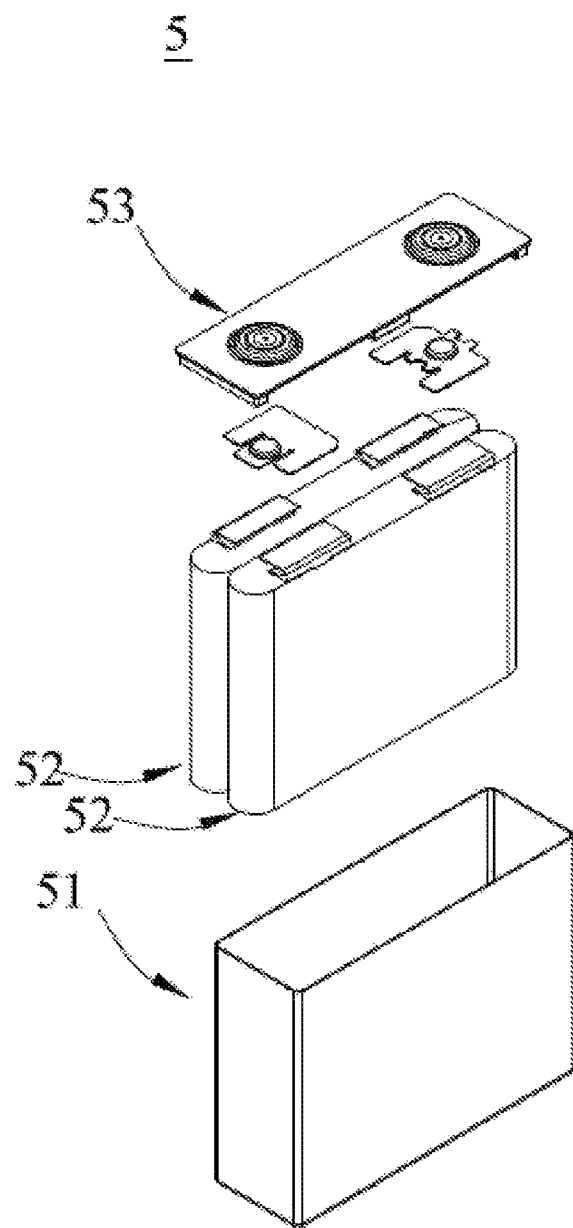
FIG. 3 is an exploded view of FIG. 2.

In a particular embodiment of the application, the electrochemical device is a lithium ion battery. FIG. 2 is a perspective view of an embodiment of a lithium ion battery 5. FIG. 3 is an exploded view of FIG. 2. Referring to FIG. 2 and FIG. 3, a lithium ion battery 5 includes a case 51, an electrode assembly 52, a top cover assembly 53, and an electrolyte (not shown).

The electrode assembly 52 is packed in the case 51. The number of electrode assembly 52 is not limited and may be one or more. The electrode assembly 52 includes a positive electrode plate, a negative electrode plate, and a separator. The separator separates the positive electrode plate from the negative electrode plate. The electrolyte is injected into the case 51 and impregnates the electrode assembly 52, which includes, for example, a first electrode plate, a second electrode plate and a separator.

Please be noted that the lithium ion battery 5 shown in FIG. 2 is a can-type battery, but is not limited thereto. The lithium ion battery 5 may be a pouch-type battery, i.e. the case 51 is replaced by a metal plastic film and the top cover assembly 53 is eliminated.

Next, a battery module of still another aspect of the present application will be described.

Figure 4:
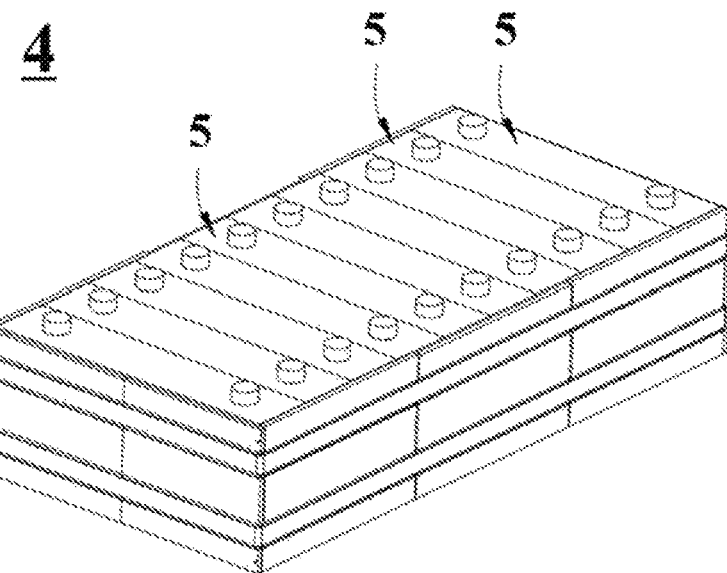
FIG. 4 is a perspective view of an embodiment of a battery module.

FIG. 4 is a perspective view of an embodiment of the battery module 4.

The battery module 4 provided by the embodiment of the present application includes the lithium ion battery 5 according to the present application.

Referring to FIG. 4, the battery module 4 includes a plurality of batteries 5. A plurality of lithium ion batteries 5 are arranged in the longitudinal direction. The battery module 4 can function as a power source or an energy storage device. The number of the lithium ion batteries 5 in the battery module 4 can be adjusted according to the application and capacity of the battery module 4.

Next, a battery pack of still another aspect of the present application will be described.

Figure 5:
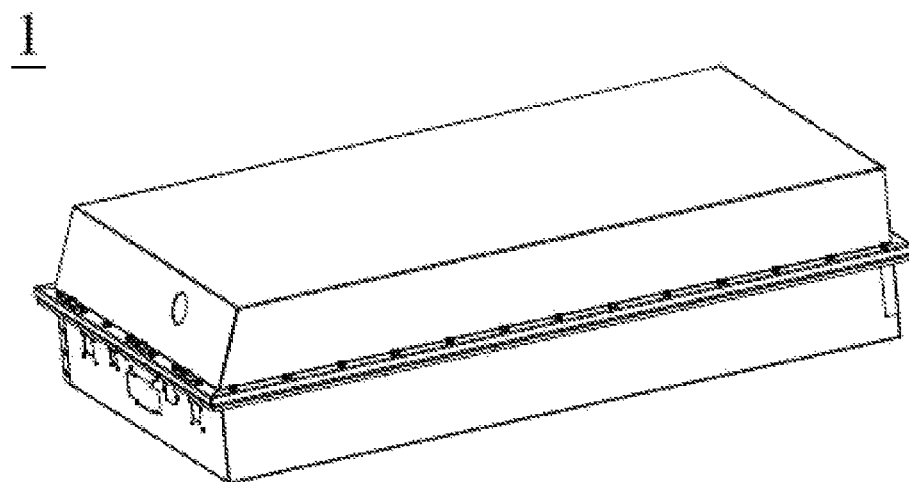
FIG. 5 is a perspective view of an embodiment of a battery pack.
Figure 6:
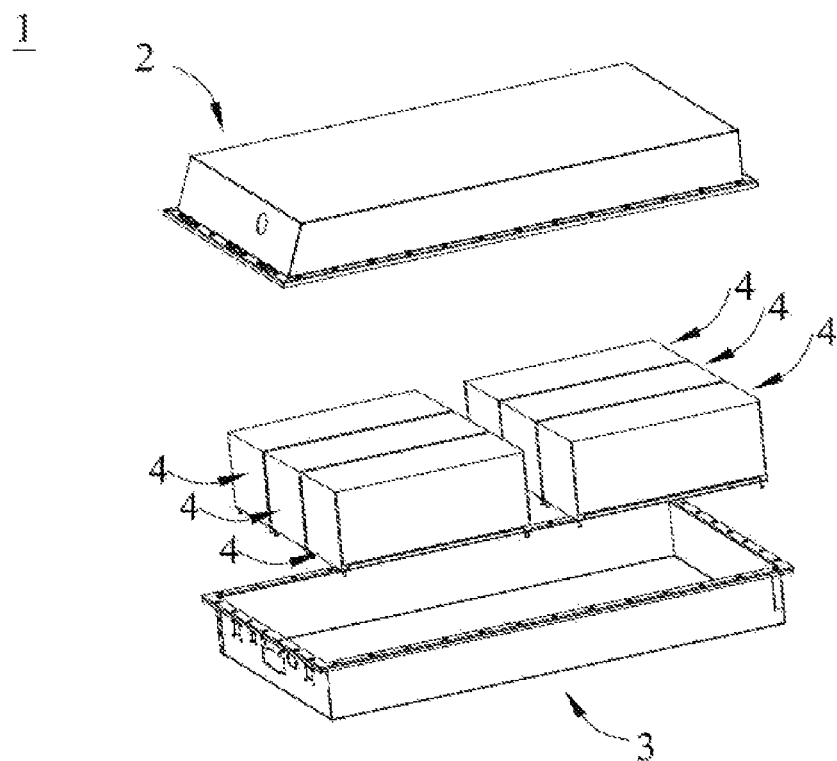
FIG. 6 is an exploded view of FIG. 5.

FIG. 5 is a perspective view of an embodiment of the battery pack 1. FIG. 6 is an exploded view of FIG. 5.

The battery pack 1 provided by the present application includes the battery module 4 according to an embodiment of the present application.

Specifically, referring to FIG. 5 and FIG. 6, the battery pack 1 includes an upper cabinet body 2, a lower cabinet body 3, and a battery module 4. The upper cabinet body 2 and the lower cabinet body 3 are assembled together and form a space in which the battery module 4 is packed. The battery module 4 is placed in the space of the upper cabinet body 2 and the lower cabinet body 3 which are assembled together. The output polar of the battery module 4 is passed between one or both of the upper cabinet body 2 and the lower cabinet body 3 to supply power to the outside or to be externally charged. The number and arrangement of the battery modules 4 used in the battery pack 1 can be determined according to actual needs.

Next, a device of still another aspect of the present application will be described.

Figure 7:
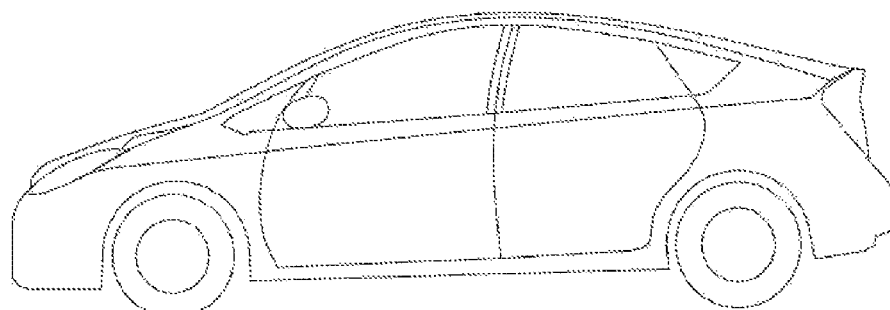
FIG. 7 is a schematic view showing an embodiment of a device wherein a lithium ion battery is used as a power source.

FIG. 7 is a schematic view showing an embodiment of a device wherein a lithium ion battery is used as a power source.

The device provided by the present application includes the lithium ion battery 5 according to an embodiment of the present application, and the lithium ion battery 5 can be used as a power source of the device. In FIG. 7, the device using the lithium ion battery 5 is an electric car. Apparently, it is not limited thereto, and the device using the lithium ion battery 5 may be any electric vehicles (for example, an electric bus, an electric tram, an electric bicycle, an electric motorcycle, an electric scooter, an electric golf cart, an electric truck) other than the electric car, electric ships, electric tools, electronic equipment and energy storage systems. The electric vehicle can be a pure electric vehicle, a hybrid electric vehicle, or a plug-in hybrid electric vehicle. Apparently, according to the actual form of use, the device provided by the present application may include the battery module 4 described in the present application. Apparently, the device provided by the present application may also include the battery pack 1 described in the present application.

Those skilled in the art will appreciate that various definitions or preferred ranges of the components, component amounts, and material physicochemical properties of the safety coating according to the various embodiments of the present application as mentioned above can be combined arbitrarily. The combined embodiments are still within the scope of the invention and are considered as part of the disclosure.

EXAMPLES

In order to make the objects, the technical solutions and the beneficial technical effects of the present application more clear, the present application will be described in further detail below with reference to the embodiments. However, it is to be understood that embodiments of the present application are only intended to be illustrative of the present application, and are not intended to limit the application, and embodiments of the present application are not limited to those embodiments given in the specification. The experimental conditions not indicated in the examples refer to conventional conditions, or the conditions recommended by the material supplier or equipment supplier.

1. Preparation Method 1.1 Preparation of Positive Electrode Plate

1) Safety Coating

Depending on whether or not the polymer matrix material in the safety coating is subjected to crosslinking treatment, the safety coating was prepared by one of the following two methods.

For the polymer matrix without cross-linking treatment:

A certain ratio of a polymer matrix material, a conductive material, and an inorganic filler were mixed with N-methyl-2-pyrrolidone (NMP) as a solvent with stirring uniformly. The resulting mixture was then coated on both sides of metal current collector, followed by drying at 85° C. to obtain a PTC layer, i.e. a safety coating.

For the polymer matrix with cross-linking treatment:

A certain ratio of a polymer matrix material, a conductive material, and an inorganic filler were mixed with N-methyl-2-pyrrolidone (NMP) as a solvent with stirring uniformly and then an activator (sodium silicate) and a crosslinking agent were added with stirring uniformly. The resulting mixture was then coated on both sides of metal current collector, followed by drying at 85° C. to obtain a safety coating.

2) Difficultly Soluble Layer

The binder and conductive material were dissolved in a suitable solvent (such as NMP or water), stirred and applied on the safety coating of the current collector prepared according to the above method; then dried at 85° C.

3) Positive Active Material Layer

Then, 90 wt % of a positive active material, 5 wt % of SP, and 5 wt % of PVDF were mixed with NMP as a solvent with stirring uniformly. The resulting mixture was then coated on the difficultly soluble layer as prepared according to the above method followed by drying at 85° C. to obtain a positive active material layer.

4) Work Up

Then, the current collector with safety coating, difficultly soluble layer and positive electrode active material layer was cold-pressed, then trimmed, cut, and stripped, followed by drying under vacuum at 85° C. for 4 hours. After welding, the positive electrode plate meeting the requirements of the secondary battery was obtained.

The main materials used in the specific examples of safety coating were as follows:

Polymer matrix: PVDF (Manufacturer "Solvay", model 5130), PVDC;

Crosslinking agent: tetraisocyanate, polyethylene glycol, acrylonitrile;

Conductive material (conductive agent): Super-P (TIMCAL, Switzerland; abbreviated as SP);

Binder: oil-dispersible polyacrylonitrile, water-dispersible polyacrylic acid, water-dispersible polyurethane and water-dispersible polyvinyl alcohol;

Inorganic filler: alumina, lithium iron phosphate (abbreviated as LFP), carbon coating modified lithium iron phosphate (abbreviated as LFP/C), carbon coating modified lithium titanate (abbreviated as $Li_4Ti_5O_{12}$/C);

Positive active material: NCM811 ($LiNi_{0.8}Co_{0.1}Mn_{0.1}O_2$).

The above materials were commonly used materials in the lithium battery industry which may be commercially available from the corresponding suppliers.

1.2 Preparation of Negative Electrode Plate

Negative electrode plate was prepared as follows: active material graphite, conductive agent Super-P, thickener CMC, binder SBR were added to deionized water as a solvent at a mass ratio of 96.5:1.0:1.0:1.5 to form an anode slurry; then the slurry was coated on the surface of the negative electrode current collector in the form of copper foil, and dried at 85° C., then trimmed, cut, and stripped, followed by drying under vacuum at 110° C. for 4 hours. After welding, the negative electrode plate meeting the requirements of the secondary battery was obtained.

1.3 Preparation of Electrolyte

Ethylene carbonate (EC), ethyl methyl carbonate (EMC), and diethyl carbonate (DEC) were mixed at a volume ratio of 3:5:2 to obtain a mixed solvent of EC/EMC/DEC, followed by dissolving the fully dried lithium salt $LiPF_6$ into the mixed organic solvent at a concentration of 1 mol/L to prepare an electrolyte.

1.4 Preparation of the Battery

A polypropylene film with a thickness of 12 μm was used as a separator, and the positive electrode plate, the separator and the negative electrode plate were stacked in order, so that the separator was sandwiched in between the positive electrode plate and the negative electrode plate, and then the stack was wound into a bare battery core. After vacuum baking at 75° C. for 10 h, the electrolyte (prepared as described in "Preparation of electrolyte" above) was injected therein followed by vacuum package and standing for 24 h. After that, the battery cell was charged to 4.2 V with a constant current of 0.1 C, and then was charged with a constant voltage of 4.2 V until the current dropped to 0.05 C, and then was discharged to 3.0V with a constant current of 0.1 C. Above charging and discharging processes were repeated twice. Finally, the battery cell was charged to 3.8V with a constant current of 0.1 C, thereby completing the preparation of the secondary battery.

2. Tests for Material Performance

In each of the examples and comparative examples, the physical property parameters of the materials were measured by a commonly known method in the art, unless otherwise specified.

Some specific parameters were tested using the following methods.

2.1 Particle Size

The power sample was dispersed in a dispersing medium (distilled water), which was measured with a Malvern laser particle size analyzer MS2000 for 5 times and averaged in μm.

2.2 BET (Specific Surface Area)

The specific surface area of the powder sample of the test material was measured with a Quadrasorb SI specific surface tester for 5 times and averaged in unit of $m^2/g$.

2.3 Binding Force Between Film Layer and Current Collector

The electrode plate containing a film layer on both sides of the current collector was cut into a sample to be tested having a width of 2 cm and a length of 15 cm. One side of the sample to be tested was uniformly adhered to a stainless steel plate at 25° C. under normal pressure by using 3M double-sided tape. One end of the sample to be tested was fixed on a GOTECH tensile machine, and the film layer of the sample to be tested was stripped from the current collector by using the GOTECH tensile machine, wherein the maximum tensile force was read according to the data diagram of the tensile force and the displacement. The resulting value (in unit N) was divided by the width of the sample i.e. 0.02 m to calculate the binding force (N/m).

2.4 Elongation at Break of Current Collector

Two samples having a length of 200 mm and a width of 15 mm were taken from the current collector. Thickness H was measured by micrometer in μm. The sample was then mounted on a tensile machine (model AI7000) and stretched at 50 mm/min. The two test results were averaged. Record the initial length L0, and start the tensile machine, until the sample broke, and read the displacement L1 of the sample at break from the tensile machine. Elongation at break=(L1−L0)/L0*100%.

2.5 Thickness of Current Collector, Thickness of Coating and Thickness of the Film Layer Thickness of the current collector was measured by a micrometer at 5 points and averaged.

Thickness of the coating and thickness of the film layer: first measure the thickness of the current collector, and then measure the total thickness of the current collector with the coating. The difference between the two values was used as the thickness of the coating. The thickness of the film layer was measured by the similar method.

2.6 Cracking of Coating

After drying and obtaining a positive active material layer, if no cracks were observed in the 100 $m^2$ electrode plate, it was defined as no cracking; if the number of occurrences of cracks in 100 $m^2$ electrode plate was ⩽3, it was defined as mild cracking; if the number of occurrences of cracks in 100 $m^2$ electrode plate was >3, it was defined as severe cracking.

2.7 Solubility of Polymer Materials in an Oil Solvent

The polymer material was made into a film having a thickness of about 7 μm, then cut into 20 mm*50 mm strips, weighed and recorded as M1;

The film was placed in NMP (N-methylpyrrolidone) solvent, placed at 130° C. for 5 min, taken out, and vacuum dried at 100° C.; after drying, it was weighed and recorded as M2;

Then solubility was calculated as $=(M1-M2)/M1*100\%$

3. Test for Battery Performance

The safety performance of the secondary batteries from various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 mm (the tip thereof had a cone angle of 45°) was used to puncture the battery plate at a speed of 25 mm/s in the direction perpendicular to the battery plate. The puncture position should be close to the geometric center of the surface to be punctured, the steel needle stayed in the battery, and then observation was made to see if the battery had an indication of burning or exploding.

3.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach a voltage of 1.5 times the charging cut-off voltage or after charging with a constant current of 1 C for 1 hour, the charging was terminated.

3.3 Cycle Performance Test:

The test conditions for the cycle performance test were as follows: the secondary battery was subjected to a 1 C/1 C cycle test at 25° C. in which the charging and discharging voltage range was 2.8 to 4.2 V. The test was terminated when the capacity was attenuated to 80% of the first discharging specific capacity.

3.4 PTC Effect Test

The secondary battery was fully charged to the charging cut-off voltage with a current of 1 C, and then charged with a constant voltage until the current was reduced to 0.05 C. After that, the charging was terminated and the DC resistance of the battery cell was tested (discharging with a current of 4 C for 10 s). Then, the battery cell was placed at 130° C. for 1 h followed by testing the DC resistance, and calculating the DC resistance growth rate. Then, the battery cell was placed at 130° C. for 2 h followed by testing the DC resistance, and calculating the DC resistance growth rate.

3.5 DCR Test

The secondary battery was adjusted to 50% SOC with a current of 1 C at 25° C., and the voltage U1 was recorded. Then, it was discharged with a current of 4 C for 30 seconds, and the voltage U2 was recorded. $DCR=(U1-U2)/4\,C$.

In the present application, for convenience of comparison, the DCR of the battery cell using uncrosslinked PVDF matrix was used as a control, and was recorded as 100%, and the DCR of the other battery cells and the ratio thereof were calculated and recorded.

4. Performance Test Results 4.1 Protection Performance (PTC Effect) of Safety Coating and Effect Thereof on Battery Performance In order to confirm the protection performance of safety coating, the corresponding safety coatings, positive electrode plates, negative electrode plates and batteries were prepared with the specific materials and amounts listed in Table 1-1 below according to the methods and procedures described in "1. Preparation method", and were tested according to the method specified in "3. Tests for battery performance". In order to ensure accuracy of data, 4 samples were prepared for each battery (10 samples for the puncture test) and tested independently. The test results were finally averaged and shown in Table 1-2 and Table 1-3.

In the test, the conventional electrode plate CPlate P was prepared with the method described in "1.1 Preparation of positive electrode plate", but no safety coating was provided. That is to say, a positive active material was directly applied over the current collector. The conventional electrode plate Cplate N was prepared according to the method described in "1.2 Preparation of negative electrode plate".

TABLE 1-1

| | | | Compositions of electrode plate | | | | | | |
|---|---|---|---|---|---|---|---|---|---|
| | | | Composition of the safety coating | | | | | | |
| | Current collector | positive active material | polymer matrix material | wt % | conductive material material | wt % | Inorganic filler material | wt % | Thickness H of safety coating (μm) |
| CPlate P | Al foil | NCM811 | / | | / | / | / | / | / |
| Comp. Plate CP | Al foil | NCM811 | Uncrosslinked PVDF | 90 | SP | 10 | / | / | 20 |
| Plate 1 | Al foil | NCM811 | Uncrosslinked PVDC | 35 | SP | 10 | alumina | 55 | 10 |
| Plate 2 | Al foil | NCM811 | Uncrosslinked PVDF | 35 | SP | 10 | LFP | 55 | 3 |

TABLE 1-2

| | Performance of lithium-ion batteries | | |
|---|---|---|---|
| Battery No. | Positive electrode plate | Negative electrode plate | Puncture Test |
| Battery 1 | CPlate P | CPlate N | 10 not pass |
| Battery 2 | Comp. Plate CP | CPlate N | 2 pass, 8 not pass |
| Battery 3 | Plate 1 | CPlate N | 10 pass |
| Battery 4 | Plate 2 | CPlate N | 10 pass |

TABLE 1-3

| | Performance of lithium-ion batteries | | | |
|---|---|---|---|---|
| Battery No. | Positive electrode plate | Negative electrode plate | Growth rate of DCR, (130° C., 1 h) | Growth rate of DCR, (130° C., 2 h) |
| Battery 2 | Comp. Plate CP | CPlate N | 20% | 30% |
| Battery 4 | Plate 2 | CPlate N | 1200% | 1500% |

The data in Table 1-1 and Table 1-2 indicated that the safety coating with PVDF or PVDC as a polymer matrix significantly improved the safety performance of the battery during nail penetration, especially in the case that an inorganic filler was added. The growth rate results of DCR data in Table 1-3 indicated that the safety coating composed of PVDF and a conductive material did have a PTC effect, and the addition of the inorganic filler significantly improved the growth rate of DCR of the battery at a high temperature, that is, the PTC effect was more remarkable.

4.2 Effect of the Content of Each Component Contained in the Safety Coating

In order to further study the effect of the content of each component contained in the safety coating, the corresponding safety coatings, positive electrode plates, negative electrode plates and batteries were prepared with the specific materials and amounts listed in Table 2-1 below according to the methods and procedures described in "1. Preparation method", and then were tested according to the method specified in "3. Test for battery performance". In order to ensure the accuracy of data, 4 samples were prepared for each battery (10 samples for the puncture test) and tested independently. The test results were finally averaged and shown in Table 2-2.

TABLE 2-2

| | Performance of lithium-ion batteries | | | |
|---|---|---|---|---|
| Battery | Positive electrode | Negative electrode | Puncture Test | Cycle Life (cycle) |
| Battery 6 | Comp. Plate 2-1 | CPlate N | 5 not pass, 5 pass | 2502 |
| Battery 7 | Plate 2-2 | Cplate N | 10 pass | 2351 |
| Battery 8 | Plate 2-3 | Cplate N | 10 pass | 2205 |
| Battery 9 | Plate 2-4 | Cplate N | 10 pass | 2251 |
| Battery 10 | Plate 2-5 | Cplate N | 10 pass | 2000 |
| Battery 11 | Plate 2-6 | Cplate N | 10 pass | 2408 |
| Battery 12 | Plate 2-7 | Cplate N | 10 pass | 2707 |
| Battery 13 | Plate 2-8 | Cplate N | 10 pass | 2355 |
| Battery 14 | Plate 2-9 | Cplate N | 10 pass | 1800 |
| Battery 15 | Comp. Plate 2-10 | Cplate N | 4 not pass, 6 pass | 1715 |

The data in Table 2-1 and Table 2-2 show that: (1) If the content of the inorganic filler is too low, then the stability of the safety coating is not high enough, so safety performance of the battery cannot be fully improved; if the content of the inorganic filler is too high, then the content of the polymer matrix is too low, so that the effect of the safety coating cannot be secured; (2) the conductive material has a great influence on the internal resistance and polarization of the battery, so it would affect the cycle life of the battery. The higher the content of the conductive material, the smaller the internal resistance and polarization of the battery, so that the cycle life will be better.

TABLE 2-1

| | | | Compositions of electrode plate | | | | | | |
|---|---|---|---|---|---|---|---|---|---|
| | | | Composition of the safety coating | | | | | | |
| | Current collector | positive active material | polymer matrix | | conductive material | | Inorganic filler | | Thickness H of safety coating (μm) |
| | | | material | wt % | material | wt % | material | wt % | |
| Comp. Plate2-1 | Al foil | NCM811 | Uncrosslinked PVDF | 75 | SP | 20 | alumina | 5 | 8 |
| Plate2-2 | Al foil | NCM811 | Uncrosslinked PVDF | 75 | SP | 15 | alumina | 10 | 8 |
| Plate2-3 | Al foil | NCM811 | Uncrosslinked PVDF | 75 | SP | 10 | alumina | 15 | 8 |
| Plate2-4 | Al foil | NCM811 | Uncrosslinked PVDF | 60 | SP | 10 | alumina | 30 | 8 |
| Plate2-5 | Al foil | NCM811 | Uncrosslinked PVDF | 60 | SP | 8 | alumina | 32 | 8 |
| Plate2-6 | Al foil | NCM811 | Uncrosslinked PVDF | 55 | SP | 15 | alumina | 30 | 8 |
| Plate2-7 | Al foil | NCM811 | Uncrosslinked PVDF | 50 | SP | 25 | alumina | 25 | 8 |
| Plate2-8 | Al foil | NCM811 | Uncrosslinked PVDF | 40 | SP | 15 | alumina | 45 | 8 |
| Plate2-9 | Al foil | NCM811 | Uncrosslinked PVDF | 35 | SP | 5 | alumina | 60 | 8 |
| Comp. Plate2-10 | Al foil | NCM811 | Uncrosslinked PVDF | 25 | SP | 5 | alumina | 70 | 8 |

It had been found through experiments that the appropriate content range of each component in the safety coating is as follows:

the weight percentage of the polymer matrix is 35 wt % to 75 wt %;

the weight percentage of the conductive material is 5 wt % to 25 wt %; and/or the weight percentage of the inorganic filler is from 10 wt % to 60 wt %.

As long as the content of each component in the safety coating is within the above range, the effect of improving the safety and electrical performance (e.g., cycle performance) of the battery can be achieved.

4.3 Effect of the Kind of the Inorganic Filler on Battery Performance

In order to further study the effect of materials in the safety coating on performance of the electrode plate and the battery, the corresponding safety coatings, positive electrode plates, negative electrode plates and batteries were prepared with the specific materials and amounts listed in Table 3-1 below according to the methods and procedures described in "1. Preparation method", and were tested according to the method specified in "3. Test for battery performance". In order to ensure accuracy of data, 4 samples were prepared for each battery (10 samples for the puncture test) and tested independently. The test results were finally averaged which were shown in Table 3-2.

TABLE 3-1

Compositions of electrode plate

| | | Positive | Composition of the safety coating | | | | | | Thickness H of safety coating (μm) |
|---|---|---|---|---|---|---|---|---|---|
| | Current collector | active material | polymer matrix | | conductive material | | Inorganic filler | | |
| | | | material | wt % | material | wt % | material | wt % | Carbon Content |
| Plate2-41 | Al foil | NCM811 | Uncrosslinked PVDF | 60 | SP | 10 | alumina | 30 | / | 8 |
| Plate2-42 | Al foil | NCM811 | Uncrosslinked PVDF | 60 | SP | 10 | LFP | 30 | / | 8 |
| Plate2-43 | Al foil | NCM811 | Uncrosslinked PVDF | 60 | SP | 10 | LFP/C | 30 | 1 | 8 |
| Plate2-44 | Al foil | NCM811 | Uncrosslinked PVDF | 60 | SP | 10 | LFP/C | 30 | 2 | 8 |
| Plate2-45 | Al foil | NCM811 | Uncrosslinked PVDF | 60 | SP | 10 | LFP/C | 30 | 3 | 8 |
| Plate2-46 | Al foil | NCM811 | Uncrosslinked PVDF | 60 | SP | 10 | $Li_4Ti_5O_{12}/C$ | 30 | 5 | 8 |

TABLE 3-2

Performance of lithium-ion batteries

| Battery | Positive electrode | Negative electrode | Puncture Test | Overcharge Test | Cycle test (cycle) |
|---|---|---|---|---|---|
| Battery 46 | Plate2-41 | CPlate N | 10 pass | 10 not pass | 2200 |
| Battery 47 | Plate2-42 | CPlate N | 10 pass | 10 pass | 2300 |
| Battery 48 | Plate2-43 | CPlate N | 10 pass | 10 pass | 2500 |
| Battery 49 | Plate2-44 | CPlate N | 10 pass | 10 pass | 2700 |
| Battery 50 | Plate2-45 | CPlate N | 10 pass | 10 pass | 2900 |
| Battery 51 | Plate2-46 | CPlate N | 10 pass | 10 pass | 3000 |

The data in Tables 3-1 and 3-2 showed that compared to other materials (such as alumina), the electrochemically active material significantly improved the overcharge safety performance of the battery. In addition, carbon coating modified electrochemically active material further improved the cycle life of the battery.

4.4 Effect of Crosslinking on Performance of Plate and Battery

The corresponding safety coatings, positive electrode plates, negative electrode plates and batteries were prepared with the specific materials and amounts listed in Table 4-1 below according to the methods and procedures described above, and were tested according to the specified method to study the effect of the crosslinking on coating cracking and DCR.

TABLE 4-1

Effect of crosslinking agent

Composition of the safety coating

| | | positive active | polymer matrix | | Conductive material | | Inorganic filler | | Crosslinking agent | | Thickness H of the underlying layer | Cracking (coating speed |
|---|---|---|---|---|---|---|---|---|---|---|---|---|
| | Current collector | material | material | wt % | material | wt % | material | wt % | type | Ratio to the polymer matrix | (μm) | 50 m/min) |
| Plate 2-51 | Al foil | NCM811 | Uncrosslinked PVDF | 60 | SP | 10 | LFP/C | 30 | No | 0 | 8 | Severe cracking |
| Plate 2-52 | Al foil | NCM811 | Crosslinked PVDF | 60 | SP | 10 | LFP/C | 30 | Acrylonitrile | 0.01% | 8 | Mild cracking |
| Plate 2-53 | Al foil | NCM811 | Crosslinked PVDF | 60 | SP | 10 | LFP/C | 30 | Tetraisocyanate | 0.1% | 8 | No cracking |
| Plate 2-54 | Al foil | NCM811 | Crosslinked PVDF | 60 | SP | 10 | LFP/C | 30 | Polyethylene glycol | 0.5% | 8 | No cracking |
| Plate 2-55 | Al foil | NCM811 | Crosslinked PVDF | 60 | SP | 10 | LFP/C | 30 | Acrylonitrile | 1.5% | 8 | No cracking |
| Plate 2-56 | Al foil | NCM811 | Crosslinked PVDF | 60 | SP | 10 | LFP/C | 30 | Acrylonitrile | 5% | 8 | No cracking |
| Plate 2-57 | Al foil | NCM811 | Uncrosslinked PVDC | 60 | SP | 10 | LFP/C | 30 | No | No | 8 | Severe cracking |
| Plate 2-58 | Al foil | NCM811 | Crosslinked PVDC | 60 | SP | 10 | LFP/C | 30 | Acrylonitrile | 3% | 8 | No cracking |

In the case where the coating speed of the positive active material layer was 50 m/min, the polymer matrix of the electrode plate 2-51 was not crosslinked by adding a crosslinking agent, and thus there was a severe cracking on the electrode plate. The addition of a crosslinking agent had a significant effect on improving the cracking of the electrode plate. No cracking occurred in the electrode plate 2-53 to the electrode plate 2-56. Similar experiments were performed for PVDC (electrode plates 2-57 and 2-58) and the results were similar. It can be seen that the addition of the crosslinking agent significantly eliminated the coating cracking of the electrode plate.

TABLE 4-2

Performance of lithium-ion battery

| Battery | Positive electrode | Negative electrode | DCR of the battery | Puncture Test |
|---|---|---|---|---|
| Battery 52 | Plate 2-51 | CPlate N | 100% | 10 pass |
| Battery 53 | Plate 2-52 | CPlate N | 80% | 10 pass |
| Battery 54 | Plate 2-53 | CPlate N | 85% | 10 pass |
| Battery 55 | Plate 2-54 | CPlate N | 78% | 10 pass |
| Battery 56 | Plate 2-55 | CPlate N | 75% | 10 pass |
| Battery 57 | Plate 2-56 | CPlate N | 84% | 10 pass |

For the electrode plate 2-51, the polymer matrix was not crosslinked by adding a crosslinking agent, and thus the polymer matrix was swelled greatly in the electrolyte, resulting in a large DCR. The addition of the crosslinking agent reduced the swelling of the polymer matrix in the electrolyte, and had a significant effect on reducing DCR. From above results, it was confirmed that the addition of the crosslinking agent significantly reduced the DCR of the battery.

In addition, the above data indicated that PVDF/PVDC can be used as the polymer matrix of PTC layer regardless of crosslinking, and the obtained battery had high safety performance in which the test result of puncture test is excellent, which indicated that the crosslinking treatment did not adversely affect the protective effect of the safety coating. Furthermore, compared with the uncrosslinked PVDC/PVDF, the crosslinking treatment improved the cracking of the electrode plate, from severe cracking to no cracking or mild cracking. The crosslinking treatment can reduce the swelling of the polymer matrix in the electrolyte, thereby reducing the DCR by 15% to 25%, thereby improving the electrical performance of the battery.

4.5 Effect of Difficultly Soluble Layer on the Performance of Electrode Plate and Battery In order to further study the effect of the introduction of the difficultly soluble layer on the performance of the electrode plate and the battery, the corresponding safety coatings, positive electrode plates, negative electrode plates and batteries were prepared with the specific materials and amounts listed in Table 5-1 below according to the methods and procedures described in "1. Preparation method", and were tested according to the method specified in "3. Test for battery performance". In order to ensure accuracy of data, 4 samples were prepared for each battery (10 samples for the puncture test) and tested independently. The test results were finally averaged which were shown in Table 5-2.

The data in Tables 5-1 and 5-2 showed that when there was no difficultly soluble layer, the electrode plate was severely cracked. When a difficultly soluble layer was present, no cracking occurred. The reasons were as follows: the difficultly soluble layer prevented the organic oil solvent in the upper active material slurry from dissolving and swelling the PVDF polymer matrix in the safety coating, thereby reducing cracking and greatly improving production efficiency. In addition, after the introduction of a difficultly soluble layer, the battery still maintained very good safety and excellent needle puncture test results, indicating that the introduction of a difficultly soluble layer had no negative effect on the protective effect of the safety coating.

It will be understood by those skilled in the art that the above implementation examples of plates of this application are only exemplified to be used for a lithium battery, but plates of this application can also be applied to other types of batteries or electrochemical devices, and still may produce good technical effects of this application.

It will be apparent to those skilled in the art that the above embodiments of the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

TABLE 5-1

Compositions of electrode plate

| | | | Composition of the safety coating | | | | | | | Composition of the difficultly soluble layer | | |
|---|---|---|---|---|---|---|---|---|---|---|---|---|
| | | Positive active | polymer matrix | | conductive material | | Inorganic filler | | Carbon content | Thickness H of safety coating | | | Thickness of difficultly soluble |
| | Polarity | material | material | wt % | material | wt % | material | wt % | (wt %) | (μm) | binder | Conductive agent | layer (μm) |
| Plate 2-61 | Positive electrode | NCM811 | Uncross-linked PVDF | 60 | SP | 10 | LFP/C | 30 | / | 8 | / | / | / |
| Plate 2-62 | Positive electrode | NCM811 | Uncross-linked PVDF | 60 | SP | 10 | LFP/C | 30 | / | 8 | 90 wt % water-dispersible polyacrylic acid | 10 wt % SP | 0.5 |
| Plate 2-63 | Positive electrode | NCM811 | Uncross-linked PVDF | 60 | SP | 10 | LFP/C | 30 | 1 | 8 | 85% water-dispersible polyurethane | 15 wt % SP | 1 |
| Plate 2-64 | Positive electrode | NCM811 | Uncross-linked PVDF | 60 | SP | 10 | LFP/C | 30 | 2 | 8 | 20% water-dispersible polyvinyl alcohol | 80 wt % SP | 2 |
| Plate 2-65 | Positive electrode | NCM811 | Uncross-linked PVDF | 60 | SP | 10 | LFP/C | 30 | 1 | 8 | 90 wt % oil-dispersible polyacrylonitrile | 10 wt % SP | 0.5 |
| Plate 2-66 | Positive electrode | NCM811 | Uncross-linked PVDF | 60 | SP | 10 | LFP/C | 30 | 1 | 8 | 80 wt % oil-dispersible polyacrylonitrile | 20 wt % SP | 1 |

TABLE 5-2

Performance of lithium-ion battery

| Battery | Positive electrode | Negative electrode | Cracking (coating speed: 50 m/min) | Puncture Test |
|---|---|---|---|---|
| Battery 61 | Plate 2-61 | CPlate N | severe cracking | 10 pass |
| Battery 62 | Plate 2-62 | CPlate N | No cracking | 10 pass |
| Battery 63 | Plate 2-63 | CPlate N | No cracking | 10 pass |
| Battery 64 | Plate 2-64 | CPlate N | No cracking | 10 pass |
| Battery 65 | Plate 2-65 | CPlate N | No cracking | 10 pass |
| Battery 66 | Plate 2-66 | CPlate N | No cracking | 10 pass |

What is claimed is:

1. A positive electrode plate, comprising a current collector, a safety coating, a barrier layer and a positive active material layer, wherein the safety coating, the barrier layer and the positive active material layer are successively disposed on the current collector; wherein the safety coating comprises a polymer matrix, a conductive material and an inorganic filler; wherein the barrier layer comprises a binder and a conductive agent, and wherein the binder of the barrier layer has a solubility in an oil solvent smaller than the solubility of the polymer matrix of the safety coating in said oil solvent.

2. The positive electrode plate according to claim 1, wherein the binder in the barrier layer is one of an oil-dispersible binder or a water-dispersible binder,
wherein the oil-dispersible binder is selected from at least one of oil-dispersible polyacrylonitrile, oil-dispersible polyacrylic acid, oil-dispersible polyacrylate, oil-dispersible polyacrylic acid-acrylate, oil-dispersible polyacrylonitrile-acrylic acid, and oil-dispersible polyacrylonitrile-acrylate; and
wherein the water-dispersible binder is selected from at least one of water-dispersible polyacrylic acid, water-dispersible polyurethane, water-dispersible polyvinyl alcohol, water-dispersible polyacrylate, water-dispersible polytetrafluoroethylene, and water-dispersible polyacrylonitrile.

3. The positive electrode plate according to claim 1, wherein in the safety coating, based on the total weight of the polymer matrix, the conductive material and the inorganic filler,
the polymer matrix is present in an amount of from 35 wt % to 75 wt %;
the conductive material is present in an amount of from 5 wt % to 25 wt %; and
the inorganic filler is present in an amount of from 10 wt % to 60 wt %.

4. The positive electrode plate according to claim 1, wherein the polymer matrix is fluorinated polyolefin and/or chlorinated polyolefin.

5. The positive electrode plate according to claim 1, wherein the conductive material and the conductive agent are each independently selected from at least one of a conductive carbon-based material, a conductive metal material, and a conductive polymer material.

6. The positive electrode plate according to claim 1, wherein the inorganic filler is selected from at least one of metal oxides, non-metal oxides, metal carbides, non-metal carbides, inorganic salts, and a modification thereof with at least one of a conductive carbon coating, a conductive metal coating or a conductive polymer coating.

7. The positive electrode plate according to claim 1, wherein in the barrier layer, the weight ratio of the binder to the conductive agent is 9:1 to 1:9.

8. The positive electrode plate according to claim 1, wherein the polymer matrix in the safety coating is fluorinated polyolefin and/or chlorinated polyolefin having a crosslinked structure.

9. The positive electrode plate according to claim 1, wherein the barrier layer has a thickness of 0.5 µm to 3 µm; and/or the safety coating has a thickness H of $1 \ \mu m \leq H \leq 20 \ \mu m$.

10. An electrochemical device comprising the positive electrode plate according to claim 1, which is a primary battery or a secondary battery.

11. A battery module comprising the electrochemical device according to claim 10.

12. A battery pack comprising the battery module according to claim 11.

13. A device comprising the electrochemical device according to claim 10, wherein the electrochemical device is used as a power source of the device.

14. The positive electrode plate according to claim 4, wherein the fluorinated polyolefin and/or chlorinated polyolefin is selected from at least one of polyvinylidene fluoride (PVDF), carboxylic acid modified PVDF, acrylic acid modified PVDF, polyvinylidene chloride (PVDC), carboxylic acid modified PVDC, acrylic acid modified PVDC, PVDF copolymers, and PVDC copolymers.

15. The positive electrode plate according to claim 5, wherein the conductive carbon-based material is selected from at least one of conductive carbon black, acetylene black, graphite, graphene, carbon nanotubes, and carbon nanofibers;
the conductive metal material is selected from at least one of Al powder, Ni powder, and gold powder; and
the conductive polymer material is selected from at least one of conductive polythiophene, conductive polypyrrole, and conductive polyaniline.

16. The positive electrode plate according to claim 6, wherein the inorganic filler in the safety coating is selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium iron manganese phosphate, lithium iron silicate, lithium vanadium silicate, lithium cobalt silicate, lithium manganese silicate, spinel lithium manganese oxide, spinel lithium nickel manganese oxide, lithium titanate, and a modification thereof with at least one of a conductive carbon coating, a conductive metal coating or a conductive polymer coating;
the inorganic filler has an average particle size D of $100 \ nm \leq D \leq 10 \ \mu m$; and
the inorganic filler has a specific surface area (BET) of not more than 500 $m^2/g$.

17. The device according to claim 13, wherein the device is an electric vehicle, a hybrid electric vehicle, a plug-in hybrid electric vehicle, an electric bicycle, an electric scooter, an electric golf cart, an electric truck, an electric ship, or an energy storage system.

* * * * *